March 6, 1934.    C. C. HANSEN    1,949,961
COUPLING
Filed July 28, 1932

INVENTOR.
*Charles C. Hansen*
BY
HIS ATTORNEY

Patented Mar. 6, 1934

1,949,961

UNITED STATES PATENT OFFICE 1,949,961

COUPLING

Charles C. Hansen, Easton, Pa., assignor to Ingersoll-Rand Company, Jersey City, N. J., a corporation of New Jersey Application July 28, 1932, Serial No. 625,320

1 Claim. (Cl. 285—184)

This invention relates to couplings for pipes and the like, and more particularly to couplings of the swivel type.

One object of the invention is to enable the members connected together by the coupling to conveniently adjust themselves angularly with respect to each other.

Another object is to provide a rugged coupling of simplified construction requiring only a few parts and which may be maintained in a high state of efficiency with minimum attention and cost.

Further objects of the invention are to prevent the several members comprising the coupling from becoming accidentally disconnected and to enable them to be conveniently assembled and disassembled.

Other objects will be in part obvious and in part pointed out hereinafter.

Figure 1:
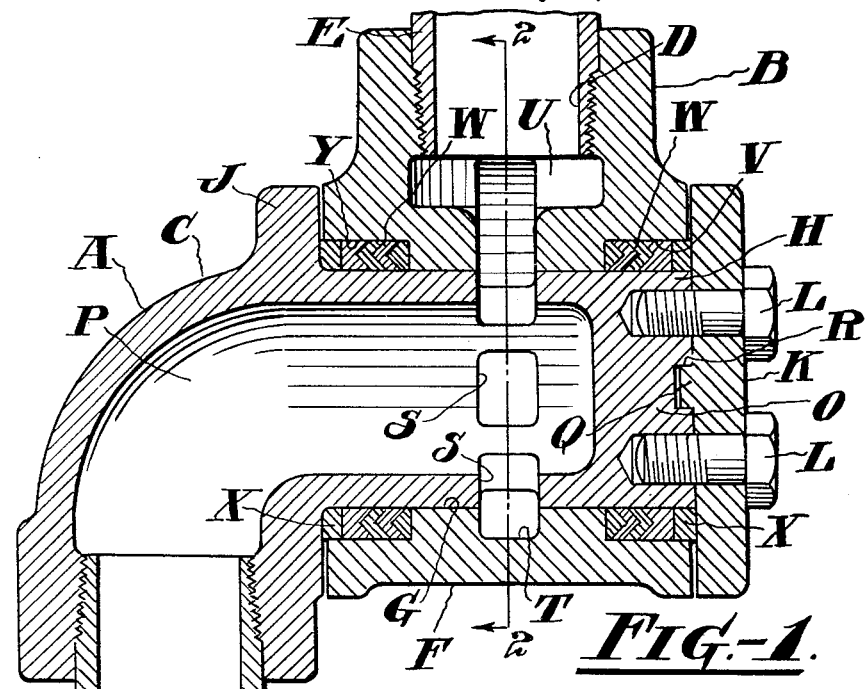
Figure 2:
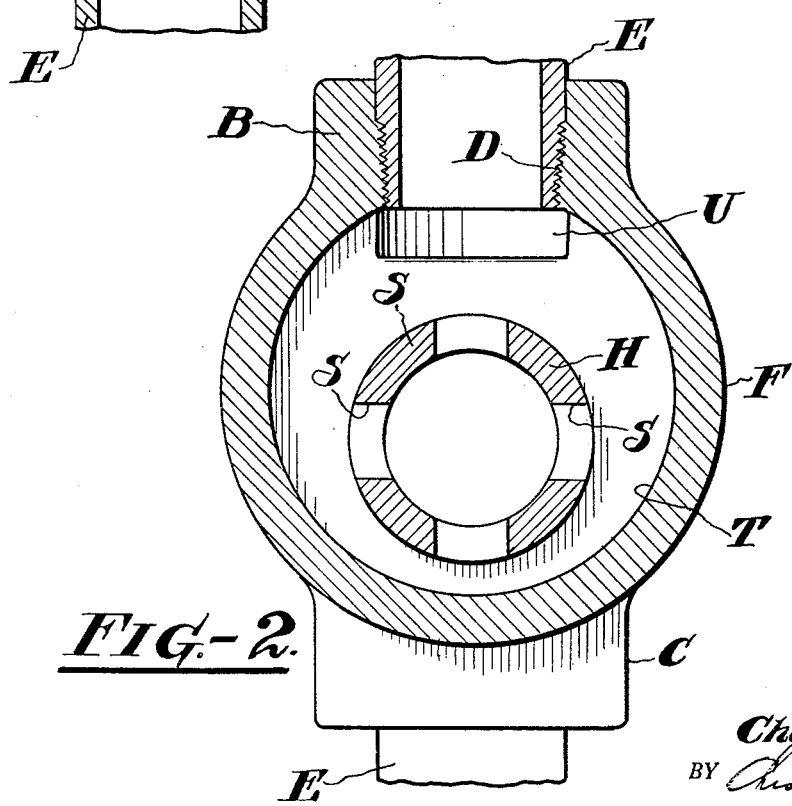

In the accompanying drawing forming a part of this specification and in which similar reference characters refer to similar parts, Figure 1 is a sectional elevation of a coupling constructed in accordance with the practice of the invention, and Figure 2 is a transverse view taken through Figure 1 on the line 2—2 looking in the direction indicated by the arrows.

Referring more particularly to the drawing, the coupling which is designated in general by A comprises a member B and a connection C illustrated as being in the form of an elbow. The member B and the connection C each have threaded apertures D for the accommodation of pipe sections E which may be parts of a fluid conveying system.

In the form illustrated the member B is of substantially T-shape and of which the cross-bar portion F is of general cylindrical form having a bore G extending entirely therethrough to receive a plain cylindrical stem H of the connection C.

In order to prevent relative longitudinal movement between the stem H and the portion F of the member B the connection C is provided with a shoulder J intermediate its ends to serve as an abutment for the adjacent end of the member B. On the free end of the stem H is a plate K which overlies the opposite end of the portion F of the member B to act as an abutment therefor.

The plate K is shown as being secured to the stem H by bolts L which extend through the plate and are threaded into an end wall O in the stem H and which wall serves as a closure for a passage P within the connection C. The plate K is preferably interlocked with the connection C. The means illustrated for this purpose comprises a rib Q on the plate K and seating into a slot R in the end wall O.

Within the wall of the stem H are a series of ports S that afford communication between the passage P and an annular passage T in the member B. The annular passage T opens into a recess U in the member B to afford communication between the annular passage and the interior of the pipe E connected to the member B.

The opposite ends of the bore G are in the form of enlarged portions V to receive a series of layers of packing material W for preventing leakage of fluid along the cooperating surfaces of the bore and the stem H. Preferably metallic rings X are disposed in the outer ends of the enlarged portions V to protect the packing material against contact with the shoulder J and the plate K and also to transmit such pressure to the packing material as may be applied by clamping the plate K against the stem H.

In practice it has been found that a coupling constructed in accordance with the present invention enables the pipe sections of a conduit system to adjust themselves readily with respect to each other. This is particularly the case in such instances of usage as where the devices to which the fluid is being supplied require frequent shifting laterally of the source of fluid supply.

As will be readily understood, by swinging one or both of the pipes connected to the coupling the member and the connection will rotate freely to follow such movement, and in all positions of the member and the connection a large area of communication will be maintained between their respective passages.

I claim:

A coupling comprising a member having a bore with enlarged portions in the ends thereof and a passage opening into the side of the bore, a connection rotatable in the bore and having a passage communicating with the first-mentioned passage, an end wall on the connection having a slot, packing material in the enlarged portions to seal the bore, a shoulder on the connection seating against one packing material and overlying an end of the connection, a plate to act as an abutment for the other packing material and overlying the opposite end of the connection, a rib on the plate seating into the slot, means for securing the plate to the connection, and wearing rings in the enlarged portions to protect the packing material against the wearing action of the shoulder and the plate.

CHARLES C. HANSEN.